(12) United States Patent
Radl

(10) Patent No.: US 8,892,477 B2
(45) Date of Patent: Nov. 18, 2014

(54) METHOD AND SYSTEM FOR FUZZY CONSTRAINED SOOTBLOWING OPTIMIZATION

(76) Inventor: Brad Radl, Chardon, OH (US)

( * ) Notice: Subject to any disclaimer, the term of this patent is extended or adjusted under 35 U.S.C. 154(b) by 349 days.

(21) Appl. No.: 13/315,994

(22) Filed: Dec. 9, 2011

(65) Prior Publication Data

US 2013/0146089 A1    Jun. 13, 2013

(51) Int. Cl.
   *G06F 15/18* (2006.01)
(52) U.S. Cl.
   USPC ............................................................. 706/12
(58) Field of Classification Search
   USPC .................................................. 706/12, 47
   See application file for complete search history.

(56) References Cited

U.S. PATENT DOCUMENTS

| 5,181,482 | A | 1/1993 | Labbe et al. |
| 6,325,025 | B1 | 12/2001 | Perrone |
| 6,425,352 | B2 | 7/2002 | Perrone |
| 6,736,089 | B1 | 5/2004 | Lefebvre |
| 6,928,937 | B2 | 8/2005 | Booher |
| 7,458,342 | B2 | 12/2008 | Lefebvre |
| 7,890,197 | B2 | 2/2011 | Francino et al. |
| 7,890,214 | B2 | 2/2011 | Francino et al. |
| 7,891,323 | B2 | 2/2011 | Frach et al. |
| 2009/0062961 | A1* | 3/2009 | Lefebvre et al. ............. 700/266 |
| 2009/0090311 | A1* | 4/2009 | James et al. ................... 122/379 |
| 2010/0064470 | A1* | 3/2010 | Dahlen et al. ................ 15/316.1 |
| 2011/0087517 | A1* | 4/2011 | Abbott .......................... 705/7.28 |

* cited by examiner

*Primary Examiner* — David Vincent
(74) *Attorney, Agent, or Firm* — Clifford Kraft

(57) ABSTRACT

A system and method to control of sootblowers in a fossil fueled power plant, in particular to plant applications systems using a graphical programming environment in combination with a set of rules to activate sootblowers. The system can be constrained by time limits and/or rule based time limits. Actual blower activation is typically based on the current status of key control variables in the process which alter the actual activation time within a constraints system. The system does not typically require knowledge or models of specific cleanliness relationships. The result is a system without sequences or queues that readily adapts to changing system conditions.

7 Claims, 7 Drawing Sheets

| Desc. | Param |
|---|---|
| PEGT_Limit | 1600 |
| Bump Time since Last Blow (hours) All Blowers | 6 |
| How long at low MW to define UOC event (hours) | 3 |
| MW Level to stop accumulated last blow time | 400 |
| Last blow reset to 0 (days) | 10 |
| Min_Time_Between_Blower Activatin(sec) | 75 |
| Stagger period between long period blowers(hrs) | 2 |
| Flag to set stagger for long period blower | 1 |
| Definition of long period blowers (hrs) | 20 |
| Cutoff duration for 'real' blow (min) | 5 |
| UOC clean period (days) | 2 |
| UOC time since last UOC (not tunable - days) | 4.03 |
| UOC time to maximum 'dirtiness' (days) | 6 |
| Time Blowers active (not tunable - %) | 38.21 |
| Griffin Blwr Alarm - clear after x (hours) | 4 |
| Effectiveness MW no save data level (MW) | 520 |
| Effectiveness Fuel Flw ROC no save data (%) | 0.5 |

System Tuning Table

METHOD AND SYSTEM FOR FUZZY CONSTRAINED SOOTBLOWING OPTIMIZATION

BACKGROUND

1. Field of the Invention

The present invention relates generally to the control of sootblowers in a fossil fueled power plant and more particularly to power plant applications systems using a graphical programming environment in combination with a set of rules to activate sootblowers.

2. Description of the Prior Art

Sootblowing is necessary to control fouling of furnace tube surfaces from by-products of the combustion process (primarily slag and soot). Generally, this is from the combustion of fossil fuel (for example, coal or oil) in a power plant for generating electricity or process steam. Sootblowing involves the removal of slag and soot with high-velocity jets of air, steam, or water.

However, there are performance penalties associated with sootblowing. The air, steam and water all impart a heat rate penalty (lower efficiency) to the power plant as they add material to the combustion process that will be heated and rejected as waste heat. In addition, the equipment itself requires power to operate, and the medium must be cleaned. Finally, the interjection of the material may lead to control issues either through sudden cooling (especially with the use of water) or by sudden temperature excursion caused by a newly cleaned surface taking in heat more quickly than the reaction time of the control system.

Additional costs occur from under-blowing, with sections that can no longer be cleaned because of excessive soot buildup. This may lead to excessively high Reheat (RH) and Superheat (SH) and Economizer temperatures as the heat not being removed from the lower water walls overwhelms the ability of spray flows or other temperature control mechanisms to maintain a proper setpoint resulting in heat being vented to the atmosphere rather than being used by the system. Conversely, over-blowing a hot surface leads to erosion and the thermal stress of the heat transfer surface. These conditions may lead to tube leaks, which at a minimum lowers the efficiency of the unit, and at worst may cause the unit to be shut down to fix the leak.

The control logic for sootblower sequencing is normally programmed into a programmable logic controller (PLC). Most modern systems will have a personal computer with a graphical user interface (GUI) for modifying sequences. Various methods of supervisory control have been implemented for the timing of activation of the sootblowers. The PLC's usually activate blowers based on timers. When an operator starts such a sequence, the system will run each blow at a predetermined time. The operator may hold the sequence, abort the sequence, or restart the sequence. Boiler engineers interact with operations to continually alter the sequences based on inspection reports identifying soot build-up (requiring more frequent blowing) or areas that appear overblown (requiring less frequent blowing). The user may have a number of predetermined sequences. These often are designed to clean specific heat exchange sections (e.g. water wall, reheat pendants, superheat pendants, economizers, and the like). Some sequences may be developed for use with different fuel types. However, pre-determined time blowing is sub-optimal as it is blind to existing slag and soot build-up.

The next generation of supervisory control introduced into the industry involved intelligent sootblowing (ISB). Generally a combination of cleanliness models, heat transfer models, heat flux models, statistical models, neural networks, expert systems, and in-situ furnace instrumentation attempts to enable plant operators to optimize sootblowing based on actual boiler operating conditions. These methods have been somewhat successful in improving the overall performance of sootblowing operations, but have common issues with maintaining additional instrument and calculations. The methods also tend to be complex leading to black boxes that prevent end-users for tuning the system further.

Several inventions are known in the prior art:

U.S. Pat. No. 5,181,482 is one of the earlier patents to describe the use of predictive models to make predictions and use this as guidance in adjusting a sootblowing sequence. The models were used to calculate the rate of fouling on specific sections of the boiler. This information is presented to the boiler operator to assist in enhancing the boiler efficiency and maintain steam temperatures within established control ranges.

U.S. Pat. No. 6,425,352 focuses on achieving desired conditions of specific surface conditions. While cleanliness models can generate this type of data, this patent broadens the concept to include any parameter indicative of the extent of deposits remaining on the surface. This parameter becomes the measure of desired condition to be achieved. The patent allows for a feedback to adjust the aggressiveness (frequency) of a blower if the desired factor is not reached or to decrease (the frequency) if the target is easily met.

The concept is further extended in U.S. Pat. No. 6,325,025 whereby a direct sensor associated with said surface is used to determine a parameter indicative of the condition of said surface. The main limitation with this concept is the focus on specific section data, without a solid method to look at the global impact of changes.

U.S. Pat. Nos. 7,458,342 and 6,736,089 describe systems that specifically utilize higher order models such as cleanliness factor, neural networks, and mass energy balance equations. These models look to balance out some of the factors neglected in earlier methods. Whether through use of direct or indirect controllers, the goal is to optimize these settings (e.g. cleanliness factor). They all require a number of inputs to be useful. The need for a number of variable results in greater inaccuracies, hidden sensitivities in the data, and increased need for methods to accommodate a loss of signals. Furthermore, these system assumes there are desired cleanliness levels for given sections of the boiler that are static. These systems schedule blowers as thresholds are crossed with a resulting a queue of blowers that will blow in the sequence they are queued.

U.S. Pat. No. 6,928,937 describes a method for determining when a furnace is to be cleaned with the view to the impact on thermal efficiency of the steam cycle of the furnace. The method looks at how blowers impact the overall efficiency by looking at the deviations the blowers had in the past and using them to guide activation in the future. The method results in activation of sequences of blowers or the queuing of blowers to be activated in a sequence.

U.S. Pat. No. 7,891,323 adds the novel concept of using the weight of a heat exchanger as an evaluation tool for triggering a sootblowing sequence. The method offers a direct way to measure the actual weight of slag and soot buildup per section of heat exchange surfaces that are hung from the infrastructure of the boiler.

In the U.S. Pat. No. 7,890,214, a method is described that addresses some of the limitation with model based sootblowing schemes previously described, though it still relies on heat absorption data that must be calculated somewhere in the system. The patent describes a statistical process control system analyzing the distribution of the heat absorption data as well as various parameters of the heat absorption distribution and using this to readjust the soot blowing operation. Besides leading to automatic adjustments in sequences, the method can also be used to detect permanent slagging conditions.

U.S. Pat. No. 7,890,197 describes a multi-model system for determining the operating sequences. The patent describes a set of sequences generated by a clean model and set of sequences generated by a model for dirty unit. These models are used based on the clean or dirty state for the specific heat exchange section.

Other types of approaches have been used including expert systems, but these again rely on cleanliness and heat flux calculations to allow logic to be developed that modifies existing sequences to better reflect the actual amount of soot/slag removed by individual blowers.

As can be seen from the prior art, a number of different techniques have evolved over time to improve upon the basic time sequenced PLC activation logic. The models themselves have become increasing sophisticated and use multiple approaches to determining the cleanliness (dirtiness) of various heat exchange sections.

It would be extremely advantageous to have a sootblowing system and method that does not rely on sophisticated models but does not preclude them either; is not expert system based per se, but rather operates off a reasonably simple set of rules accommodating all the various modes of operation. It would also be advantageous to have a system and method where the user imparts his knowledge of the key control variables that by definition are going to have high availability such as reheat (RH) and superheat (SH) temperature, RH and SH spray flows, Economizer Temperatures and the like while allowing the system to include other direct measurements such as a delta pressure across heat exchange sections as an early indication of fouling.

SUMMARY OF THE INVENTION

The present invention relates to the control of sootblowers in a fossil fueled power plant, in particular to plant applications systems using a graphical programming environment in combination with a set of rules to activate sootblowers. The system can be constrained by time limits and/or rule based time limits. Actual blower activation is typically based on the current status of key control variables in the process which alter the actual activation time within a constraints system. The system does not require knowledge or models of specific cleanliness relationships. The result is a system without sequences or queues that readily adapts to changing system conditions.

The system and method of the present invention does not require sequences, nor does it need to queue blowers for activation. Each time the system runs it evaluates every blower. The program evaluates the permissives and control setpoints and ranks the blowers. If permissives are met, the top rank blower executes, and an activation signal is sent to the PLC or other sootblowing control device. If more than one header is available, allowing simultaneous blowers, then each header may have one blower activated. An advantage of the present invention is the ability to treat multi-header configurations as independent systems. The system can also perform diagnostic checks beyond the normal PLC logic checks or those of other supervisory control systems.

DESCRIPTION OF THE FIGURES

Attention is now directed to several drawings that illustrate features of the present invention:

FIG. 1 shows a portion of a tuning screen
FIG. 2 shows a larger portion of a tuning screen.
FIG. 3 shows a system tuning table.
FIG. 4 shows a complete tuning screen.
FIG. 5 shows an RH & SH tuning table.
FIG. 8 shows and effectiveness table Several drawings and illustrations have been presented to aid in understanding the present invention. The scope of the present invention is not limited to what is shown in the figures.

DETAILED DESCRIPTION

Figure 7:
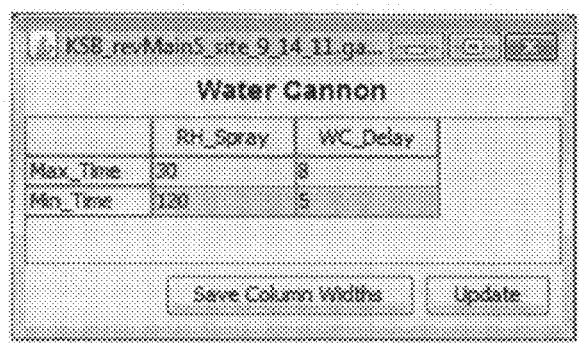
FIG. 7 shows a water cannon box.

The present invention relates to the control of sootblowers in a fossil fueled power plant, in particular to plant applications systems using a graphical programming environment in combination with a set of rules to activate sootblowers. The method, while not prohibiting the use of models, relies on basic control setpoints and the users knowledge of the unit to set up a relatively simple fuzzy constrained system that can react vary quickly to changing conditions. By not creating sequences or queuing sootblowers, the system can evaluate every few seconds (or less if necessary) whether sootblowing is warranted based on current status of the control setpoints. By use of approach limits, the present invention avoids alarm conditions and maintains temperatures, pressures and spray flows closer to the desired value. The use of a time bounded or constrained system permits a system to have flexibility to react to process upsets, whether of short duration, (such as a water canon blowing in the lower part of the furnace), medium duration (such as a mill out of service) or longer duration (such as a fuel switch). The minimum time constraint ensures that overblowing does not occur, while the maximum time constraint ensures that blowers are at least periodically activated even if a cleanliness measure indicates that a section is clean. This becomes important because some sections, while clean per the modeling method, may have soot buildup that impacts other sections or should be cleaned periodically to avoid a heat balance change when cleaned. By waiting too long, when these sections are blown, they create large temperature excursions in RH or SH temperature even if the cleanliness measure for that section shows little or no change. Hence, the user need only know what the approximate upper limit should be for the length of time between blows.

Typically, a sootblowing system is broken into its constituent supply headers (a header supplies water, steam or air). Normally, a system allows only one blower to be active off a header at a given time. If more than one sootblower can be active, then the rule can be modified to permit the maximum allowed for that header. For larger plants, more than one header is normally provided. While the present invention can allow this case to be treated as one large system as most other methods do, the maximum benefit is typically achieved by treating each independently. The examples given here are representative of system that has a North and South steam header for sootblowers. Any type of system can be handled by the present invention and is within the scope of the present invention. One advantage of this configuration is the ability to shut down one side for maintenance while the other side operates. In a conventional situation, the whole sootblowing system must be bypassed.

System Operating Philosophy

Figures 1, 2:
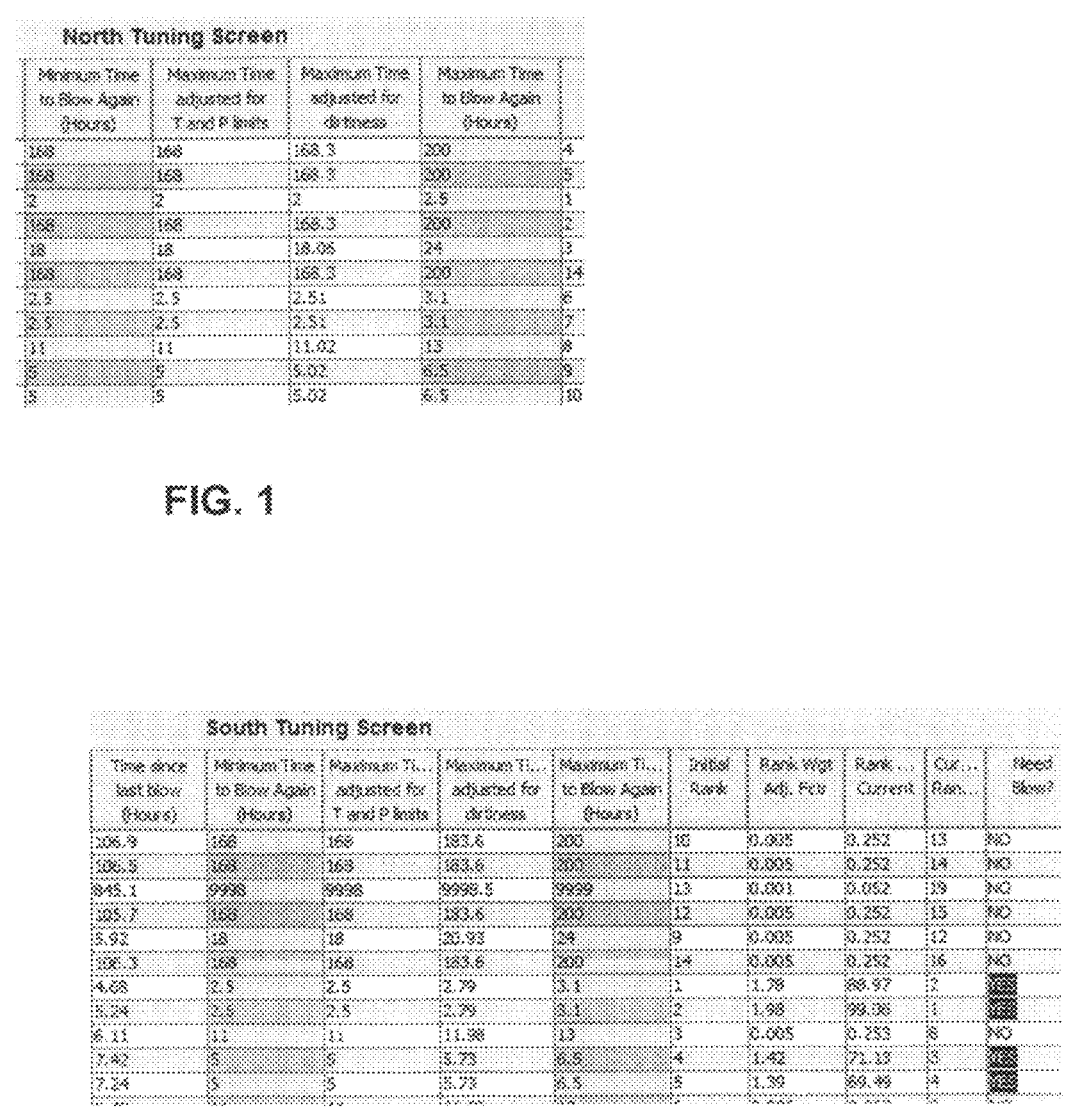

An important aspect of the present invention involves time constraints. Each sootblower needs to have a minimum and maximum time defined. These can be the middle columns of the individual blower tuning screens. These center columns are shown in FIG. 1.

The Minimum Time is the absolute minimum time between activation of a sootblower by system logic. Only by bypassing the present invention or by initiating a manual blow can a user cause a blower to activate more often than the minimum time. This is the preferred embodiment, though their may be circumstances where this limit becomes a guideline like the maximum time.

The Maximum Time is typically more of a guideline. There are several conditions that can cause the time between blows to exceed the maximum time. These include, the blower is out service, blower has a system alarm condition, the system has an alarm condition, a user hold, a hold condition, opposite blower restriction or several blowers meet the current set of permissives (note, the blowers do not queue in this situation, but are instead evaluated each cycle as the act of blowing the top rank blower may cause a change of the system state to one where fewer or different permissives are met). The user can schedule event specific or periodic e-mail's or reports including, but not limited to, the time spent sootblowing, which blowers were activated, the number of blowers past the maximum time line, failed start signals and other events that should be noted or investigated by the end-user.

The Maximum time adjusted for T and P limits, in this example, is the actual trigger time for a blower that will queue it for a sootblowing operation. This time and the maximum time will be equal for a clean unit with no physical parameters on approach to limit conditions.
The Maximum Time adjusted for dirtiness will be <=to the Maximum Time. The Maximum Time adjusted for T and P limits will be <=to Maximum Time adjusted for dirtiness.
The Maximum Time, Maximum Time adjusted for dirtiness and Maximum Time adjusted for T and P limits will be >Minimum Time.
Going from left to right on the tuning screen:
Min. T<Max. T adj. for T and P<=Max. T adj. for dirtiness<=Max. T
While this is one particular implementation, there are many possible contributing factors that may be included. The basic premise though is each blower has an individual time window (between the Min. T and Max. T). This window can be expanded or shrunk much like an accordion, but based on physical parameters (global and/or local), which then feeds a ranking and permissive system for determining if any blower should blow, and if yes, which one.
There is no limit to the number of factors affecting this time window. Nor is there a limitation to the type function (e.g. linear, non-linear, statistical, n-net, first principles, etc.).

The sample system has at least two ways to reduce this maximum time. One is a global parameter to incorporate unit dirtiness. The other is a local parameter based on the grouping of where the sootblowers are located in the furnace and how they affect the desired control parameter.
The Maximum Time adjusted for T and P limits is a linear extrapolation. It looks at the parameters displayed on the Physical Limit Tuning Screen to estimate total unit dirtiness. The user can put in different relationships into the logic, but the standard implementation is as follows:

Maximum Time adjusted for $T$ and $P$ limits=Min $T$.+((1−% dirty)*(Max. Time−Min. Time))

Where % dirty=(Days since UOC−UOC clean period)/(Day to Max Dirty−UOC clean period)

Therefore when the unit has been running at full load (or at least non UOC condition) for a extended period of time the maximum time will converge down to the minimum. When it reaches the Min. T+1%, the time will be at the lowest Max. T allowed by the system.

During normal operation the unit will either be clean or only partially dirty. When clean the Maximum Time adjusted for T and P limits=Maximum Time. When partially dirty it will be at an intermediate value. The unit dirtiness affects all blower times.

The second adjustment is blower specific. The system comes with a series of tuning screens such as shown in FIG. 2 with desired limits on physical parameters. As critical values are approached they either expedite a blowing session or they put blowers on hold to prevent a temperature or spray flow limit violation. The user may set up any type of equation, but the base system is set up such that a linear relation is set-up between starting at the physical limit+/−the approach value. With no time reduction outside this band, and the time reduced to Min. T+0.1% if the physical limit is reached. The Maximum Time used is the Maximum Time adjusted for dirtiness. Typically, under no circumstances will the this time fall below Min. Time+0.1%.

The Maximum Time adjusted for T and P limits is used to determine which blower should blow next. If the Time since last blow exceeds the Maximum Time adjusted for T and P limits, then the blower receives a YES—Need Blow? signal. The current rank displays the last pass evaluation of which blower should blow next. This is not a queue, but the current ranking and may change in the next pass. The blower ranked number one (1) will blow next as soon as any system constraints on initiating blows are removed (e.g. too soon after last blow started, operator bypass of the system or the like).

Any number of functions may be inserted that adjust the maximum blowing time. The functions may be linear or non-linear. The functions may shrink or delay the actual activation time limit. Even with the simple rules described above, the resulting behavior of the sootblowing system becomes complex, mimicking to a degree the actions of an engineer who constantly observes the system and is allowed to choose a single blower on an ongoing basis. While the method described herein strives for simplicity of logic and simplicity of dependent signals, there is no inherent limitation with regards to incorporating more complex models.

Rankings and When to Blow

A blower receives a Yes to activate only when the time since last blow equals or is greater than the Maximum Time adjusted for T and P limits The rankings may be determined by any method specified by the user in the logic, but the default set-up will calculate the % of time past the trigger limit. For example, if two blowers are past the max time adj. for T and P trigger, they will be evaluated as follows.
Trigger Limit: Blower A=2 hours, if at 3 hours since last blow, the time past is 50%
Trigger Limit Blower B=10 hours, if at 3 hours since last blow, the time based 10%

Therefore Blower A will be ranked higher and be initiated at the next opportunity. The user may note that the rankings are dynamic as the system has a build in bias to run the short cycle blowers ahead of long cycle blowers.

System Tuning Screen

The system tuning screen shown in FIG. 3 is typically the Top Level Screen for control of program operation. It affects the general program operation and the parameters selected are unit specific and typically are the global impact parameters impacting the time windows. In the Graphical programming environment (GPE) the user sets up the logic using these tuning parameters (FIGS. 3a and 3b show the GPE implementation for permissive checks and for a diagnostic check).

The example parameters are discussed below, including some knowledge base enhancements, such as, a bump time feature for cases where a 'particularly sooty fuel' has been burned or the user is testing, dead time, when you are at low power (i.e. the unit cools, causing the metal to contract and slag to fall, delaying any need for sootblowing), detection of a unit outage to reset the time windows, a delay time between any blower activation (acts as a negative permissive to allow the unit control system to settled out between blower activations), criteria for a diagnostic on whether a blower has activated or was aborted early, detection criteria for 3 tries and your out (i.e. alarmed and negative permissive set) logic and criteria for when data should be kept for effectiveness tables (described later). The list is not intended to be inclusive, but a set of examples of how the knowledge based system can be configured through the GPE into an easy to tune system, and one with a simple set of parameters, they may look like complex behavior.

FEGT Limit—Available limit to use in adjusting maximum time to blow.

Bump Time since Last Blow (hours) All Blowers—This is primarily used in testing, but can be used to accelerate blowing for all blowers. The time entered will be 'deducted' from the current last time blown for all blowers. This effectively is added to the time since last blow and will likely trigger blowers exceeding the maximum time frame. A negative value can be entered which delay blows by making it seem they had occurred more recently. If a unit is exceptionally clean or a temperature is too high this allow more soot to accumulate.

In general, it is not recommended to delay blowing for all blowers as this may tend to compound issues. Instead, it is generally recommended to go to the individual blower tuning screen and change the Minimum and Maximum time to blow for the targeted temperature region.

How long at low MW to define UOC event (hours)—This parameter is used to define a Unit of Choice (UOC) event. When a UOC event occurs it will trigger a different set of logic for sootblowing. These include:

1) Effectively cease blowing and accumulate dead-time (do not accumulate time) for time since last blow. When the UOC event is over, the time returns to accumulation mode and sootblowing will return to normal.
2) A counter is reset to zero for unit cleanliness. The counter is used to determine whether a unit as a whole is likely to be 'clean' or 'dirty' When dirty, the maximum times will start to shrink towards the minimum times. This shrinkage is determined by parameters: UOC clean period and UOC time to maximum 'dirtiness'. The time accumulated is shown in the parameter UOC time since last UOC.

MW Level to stop accumulated blow time—This parameter determines what load level the term How long at low MW to define UOC event (hours) will start it's timer. The UOC counter will run until the MW level return above this parameter. There is not data averaging, so any spikes in power will cause a reset in this parameter.

Last blow reset to 0 (days)—If the UOC counter get to this parameter, it assumes the unit has been shutdown for maintenance and resets all parameters. The same result can be achieve if you start and stop the KSB application. This includes:

1. All blow times (except as noted below) will be reset to the time that power first reaches the MW Level to stop accumulated blow time parameter.

2. Long time frame blowers as defined by Definition of long period blower, will be staggered so they do not all start at the same time. The logic will look at each blowers maximum time. If the maximum time is greater than the Definition of long period blower, then starting with the current time it will add Stagger period between long period blowers. This is cumulative, so if the stagger is 4 hours and 10 blowers meet the criteria, the last blower will start with 40 hours of accumulated time.

The user will want to see how many long term blowers there are and pick a stagger period, so that blowers are not triggered on start up. For example, if there are 10 long term blowers meeting criteria of Max time of 100 hours. And the stagger is put at 20 hours. The last 6 blowers with times between 100 hours and 200 hours will trigger immediately. A stagger value of 2 hours on the other hand, means none will blow for 80 hours, perhaps too long to wait for the first blow. Min_Time_Between Blower Activation (sec)—To avoid starting blowers simultaneously, as soon as a blower activation signal is sent, this triggers a hold on ANY new blower being activated. When this period expires, blowers meeting all other criteria may blow.

Stagger period between long period blower (hrs)—This parameter will be used when starting the application. It may also be triggered when the Last blow reset to 0 is met and the unit returns to power. Long time frame blowers as defined by Definition of long period blower, will be staggered so they do not all start at the same time. The logic will look at each blower's maximum time. If the maximum time is greater than the Definition of long period blower, then starting with the current time it will add Stagger period between long period blowers. This is cumulative, so if the stagger is 4 hours and 10 blowers meet the criteria, the last blower will start with 40 hours of accumulated time.

Flag to set stagger for long period blower—The user may simulate a start of the application or a maintenance outage by setting this to a value of 1. The logic will reset this to 0 after setting the stagger for all the long period blowers.

If long period blowers are starting to converge on similar times of operation or if you have reset the stagger period or long period blower definitions, this can be used to force a reset of the stagger (simulated start of the application) without affecting any non-long term blower.

Definition of long period blowers (hrs)—The parameters described above relating to long period blowers look at the maximum time of all blowers. If they equal or exceed this value they are 'tagged' as long period blowers and therefore affected by any logic regarding stagger.

Cutoff duration for 'real' blow (min)—This is a diagnostic parameter used to detect non-functioning blowers. Also, it avoids treating test blows by maintenance crews as full cleaning events. When a blower is started the start time is noted. When the blower returns to the off state this time is noted and the duration calculated. If the duration is less than the above parameter, the blow is not treated as an official sootblowing operation. This means it will very likely re-queue soon if not immediately, and try again. If after 3 tries, it has not successfully blown, the logic will:

1 Send an e-mail to users indicating a blower problem.
2 Put the blower in a system Hold for the period defined by Blwr Alarm—clear after x (hours). No blowing is permitted to be activated by the system during this period. It is hoped the user initiate maintenance and manually activate the blower to test the fix and this will logged and noted by the system. If the system period expires, it will try again with the blower. If it fails 3 times again, it will typically repeat the cycle.

The 'real' blow time period needs to long enough to avoid counting normal maintenance activities as sootblowing operations. The system tracks the duration and displays the last duration period in the tuning screens. Picking a value that is 30-60 seconds short of a 'normal' blow period is recommended.

UOC clean period (days)—Defines the period of time since a UOC event or start of the application, when the unit is considered to clean. Only after this time is exceeded will Maximum will begin a linear decent towards the minimum time. This works in concert with the UOC time to maximum 'dirtiness" (day) and UOC time since last UOC to determine the actual reduction in maximum time.

UOC time to maximum 'dirtiness" (not tunable-days)—The actual time since the last UOC event. This is not tunable.

UOC time to maximum 'dirtiness" (days) Defines the time at which the unit is considered to at a maximum state of dirtiness due to continued running at full load. When this period is reached the unit will be activated blowers at the highest frequency permitted by the system. The Maximum Time adjusted for T and P limits will be equal to the Min T+0.1%

Time Blower active (not tunable-%)—This is the percent of time that blowers are active per 24 hour period. This value is written out in the daily e-mail status report. This is not tunable.

System Blower Alarm—clear after x (hours)—When a blower has failed to activate or had too short of a blow period to qualify as a sootblowing operation for 3 tries it is flagged with a system Hold Alarm to prevent activation for the period defined here.

Effectiveness MW no save data level (MW)—The system keeps change in all physical parameters delta values as reflected in the change of the value from the beginning to the end of the sootblowing operation. This is average over the last 20 sootblowing operation that meets the definition of steady state. The MW value must have changed by less than the value defined here to qualify as steady state. Note, more than one value may need to be met for the value to be saved. (e.g. Fuel flow ROC).

Effectiveness Fuel Flw ROC no save data (%)—The system keeps change in all physical parameters delta values as reflected in the change of the value from the beginning to the end of the sootblowing operation. This is average over the last 20 sootblowing operation that meets the definition of steady state. The Fuel Flow value must have changed by less than the value defined here to qualify as steady state. Note, more than one value may need to be met for the value to be saved. (Such as MW ROC).

Blower Tuning Screen—Time Constraints

Figure 4:
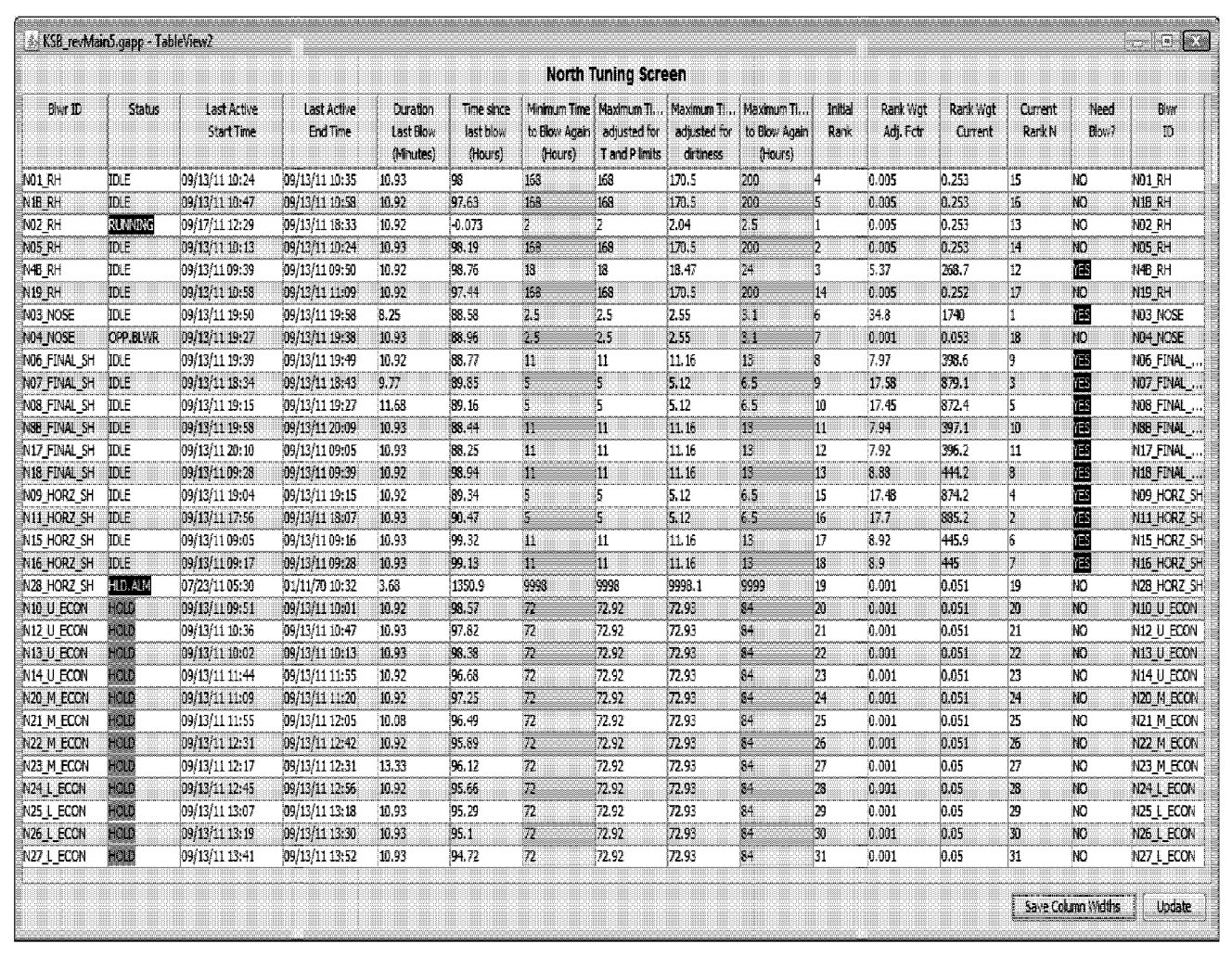

The most common screen for tuning blower operation is shown in FIG. 4. This provides a detailed view for each of the blowers and how they are constrained with regards to time and affected by limits, unit dirtiness and physical parameter limits associated with the points. This screen is an example of a summary screen to display to the user the combination of global and local constraints and the net impact on the time window. It shows the user the result of all the most recent calculations and updates with each program cycle. Many columns are tunable by the user. In this case, the user can adjust the Min. Time to blow and the Max. Time to blow, effectively sets the limits on the time window for the blower activation. As all other parameters are scaled in some fashion to these limits, the next execution pass will automatically update the other parameters and display whether this has a caused a situation for a blower to be in demand to blow.

Any number of parameters may be displayed in this screen, but below is a summary of sample fields that may be incorporated.

For system with split headers, where multiple blowers can operate and operate independently these may broker in separate tuning screen per header. Each of the columns is discussed below. Only the Minimum Time to Blow Again and the Maximum Time to Blow Again are user tunable parameters. Some columns can be colored to show they are user changeable.

Blwer ID—Fixed ASCII character identifier for the individual blower.

Active—Displays the current blower state. The system reads the status from the PLC for the current state which may include ILDE, RUNNING, LOCAL, OOS and ALARM. In addition, the system can add additional conditions of HOLD (from physical limits), HLD ALM from failure for a blower to start and OPP BLWR which is a prohibit against opposite blowers blowing at the same time.

Last Active Start Time—The time of the last successful blow when the blower was activated.

Last Activated End Time—The time of the last successful blow when the blower switched back to the IDLE state.

Duration of Last Blow (minutes)—The difference in time between Last Activated End Time and Last Active Start Time. Should this period be less than the value defined for Cutoff duration for 'real' blow (min), then these will be reset to the past know good blow operation.

Time since last blow (hours)—This is the difference in time form the last completed blow and the current time. If there has been a UOC event, the values will not match as 'dead time' will be added for the period of time past the UOC event period definition.

Minimum Time to Blow Again (hours)—Critical Parameter. Unless in Manual, this is the minimum time between blower activations.

Maximum Time adjusted for T and P limits—This is the trigger time, when a blower is allowed to become active. When this value is exceeded a number of permissive will checked and its ranking determined. If all the permissive are clear and the blower is number 1 for its steam header it will be permitted to blow.

Maximum Time adjusted for T and P limits—This is an intermediate value for the Maximum. It is the Maximum time adjusted for unit dirtiness.

Maximum Time to Blow Again (Hours)—Critical Parameter. Under 'ideal' conditions this is the maximum time allowed to between blower activations for this individual blower. There are situations where various holds and operator bypass conditions may allow this the actual time to exceed this max time.

The minimum times and maximum times determine the constraints on the system. If the Min. and Max. are too narrow the systems ability to respond to the actual physical conditions becomes constrained. Too wide, and there may occasions of excessive blowing or soot build-up not being shown in the physical parameters. To start it is recommended to start with values that will have the minimum time roughly match your current time sequences, especially if it is believed that the current sequence system is over-blowing. Make a conservative best estimate on how long various sections can go without blowing to set the maximum units. Through unit inspections these values can be tuned over time. In particular, the combination of visual inspections with the effectiveness tables can allow blower specific tuning that results in reduced total blows while achieving better control over operating parameters.

Initial Rank—Breaks ties when calculating the next blower to run, the initial ranks are per header.

Rank Wgt. Adj. Fctr—System calculated value to bias ranking when certain conditions exist. For example, when the minimum time is not met, the value is multiplied by 0.001 to keep it out the rankings. When the minimum time is met, but it is not yet into trigger range, it is 0.005. Once only the trigger time has been reached will it show a value of 1 or more.

Rank Wgt Current—The current calculated weight.

Current Rank (N or S)—The current ranking within the given header.

Need Blow?—If all permissive are met and the trigger point is reached (as determined by the Maximum Time adjusted for T and P limits, then this will display a YES.

In normal operation, there will rarely be more than 1 or 2 of these as the system does not queue blows and should not 'get behind'. If a number of blowers are YES and the system did not just return from an operator bypass condition or have the time bumped to accelerate cleaning, then the user should evaluate the Min and Max Times to see if some of them can be raised. In addition, look the percent time blowers are active number will let you know if the blowers are running near continuously. Unless the unit is barely keeping the conditions desired, raising either the minimum or maximum times is advised.

Blwer ID—Fixed ASCII character identifier for the individual blower.

Blower Tuning Screen—Physical Constraints, Back-End

Figure 5:
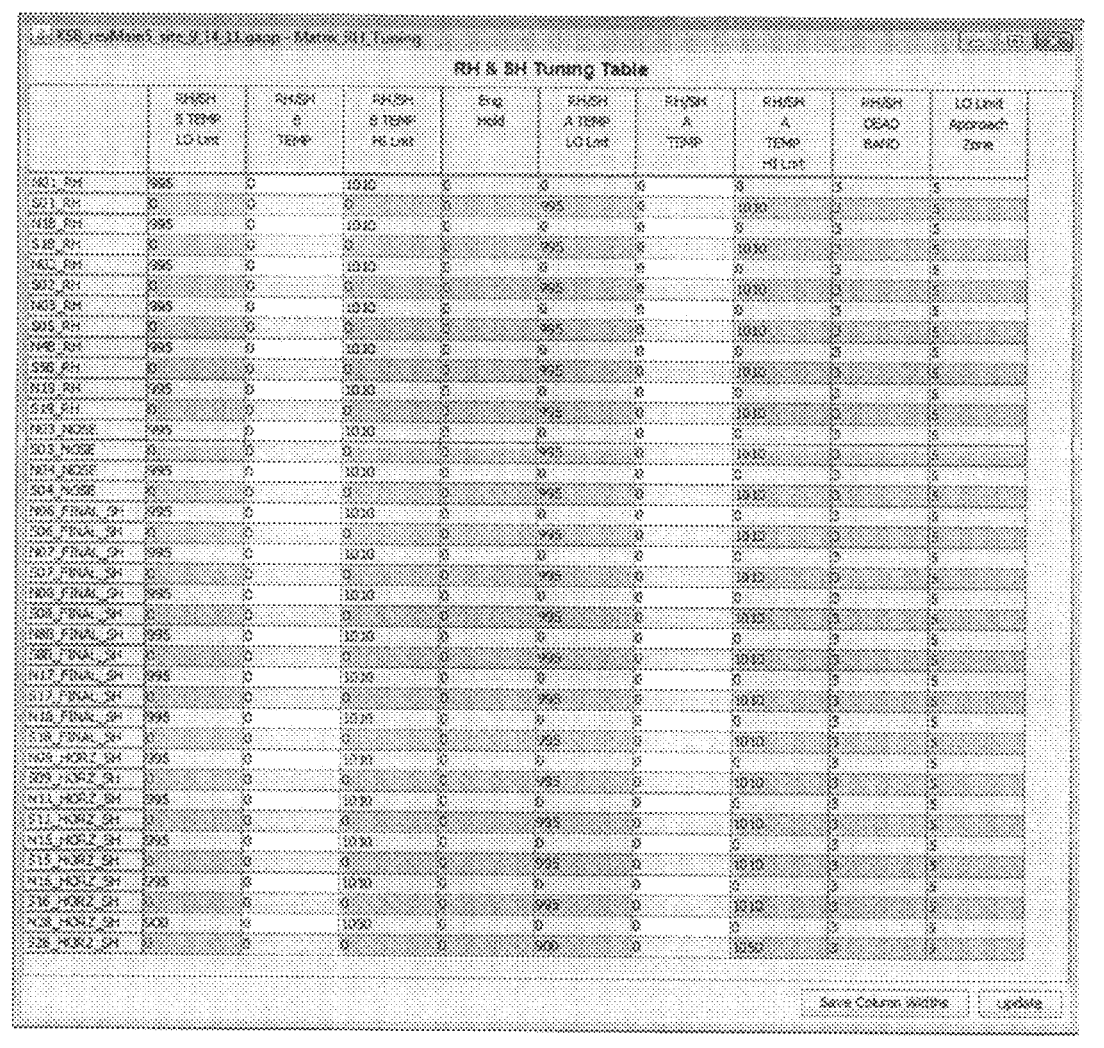

Each blower has it's own set of constraints which affect the whether the sootblower should be on hold (let the area get dirtier) or should accelerate the blow period by reducing the maximum time to blow. This get reflected in the trigger value (Maximum Time adjusted for T and P limits). Each section of the plant furnace may have slight variations on the limits, but basically they will be of the format shown in FIG. 5. This screen is an example of a screen to display and tune for local constraints impacting the time window for an individual blower in a group. It shows the user the result of all the most recent calculations and updates with each program cycle. Some columns are tunable by the user. Below is an example of one possible configuration for tuning the RH and SH blowers. It involves both adjustments to the Max Time (shrinking the time window towards the minimum) and invoking negative permissives which prohibit blows unless the conditions permit.

RH/SH B TEMP LO Lmt—This is the low limit for the reheat or superheat temperature. The goal is to blow often enough to keep the temperature above his value. The trigger value Maximum Time adjusted for T and P limits will start moving towards the minimum time when the actual temperature is at RH/SH B TEMP LO Lmt+LO Limit Approach Zone. If the actual temperature drops to the RH/SH B TEMP LO Lmt, the Maximum Time adjusted for T and P limits will be at Min. T+0.1%. This is tunable per blower. Note, the limits allow side to side tuning.

By allowing tuning per blower you can balance out the desire to maintain a constant temperature with the large T excursions that may occur with some blows. E.g. if a blower has small affects of 2 Deg. F., you may want to increase the LO limit to 1000 Deg. F., whereas if the blower causes a 20 Deg. F. increase, you may decrease the LO limit to 985 Deg. F.

RH/SH B TEMP—The actual B reheat temperature.

RH/SH B TEMP HI Lmt—The temperature at which the blower will be put into a system HOLD. This hold will not clear until the temperature has dropped to the RH/SH B TEMP HI Lmt—RH/SH DEAD BAND. So if the limits 1010 and the deadband is 10, the temperature must drop to 1000 before this blower is permitted to activate again.

Eng Hold—The engineer can force a hold condition by entering a 1. This will keep the blower in HOLD until the engineer manually turns this value back to 0/RH/SH A TEMP LO Lmt—Same as RH/SH B TEMP LO Lmt, only the opposite side (A side versus B side).

RH/SH A TEMP—The actual A reheat temperature.

RH/SH A TEMP HI Lmt—Same as RH/SH B TEMP HI Lmt, only the opposite side (A side versus B side).

RH/SH DEAD BAND—The value subtracted from a HI lmt hold condition before the hold condition will clear.

LO Limit Approach Zone—The value added to a low limit at which time the Maximum Time adjusted for T and P limits begin to be reduced linearly towards the Minimum Time.

All fields except the actual temperatures are typically tunable by the user.

Figure 6:
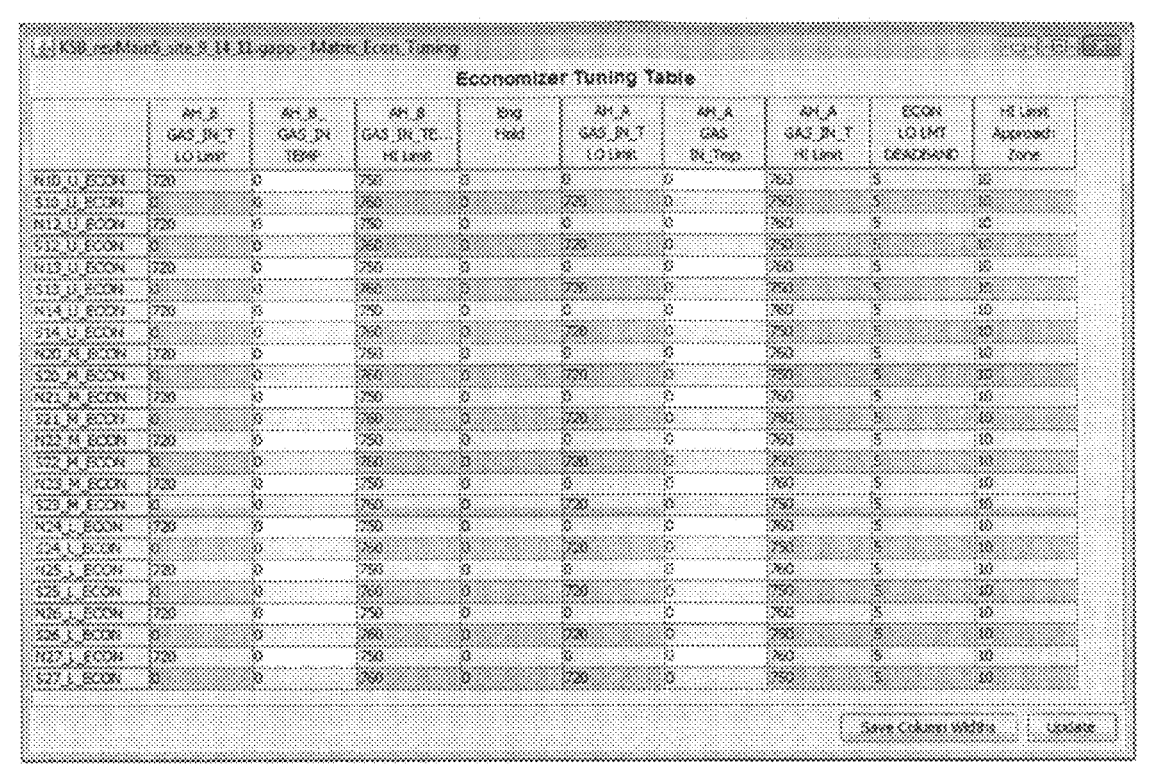

FIG. 6 is the Economizer Tuning Screen. This screen is a second example of a screen to display and tune for local constraints impacting the time window for an individual blower in a group. It shows the user the result of all the most recent calculations and updates with each program cycle. Some columns are tunable by the user. This is similar to the RH and SH Temperature tuning screen, but 'reverse' acting on the desired temperature with regards to permissive prohibit generation and shrinking the time window on T approach.

FIG. 7 is an example of interacting with an independent blowing system, in this case an Intelligent Water Canon Cleaning system. The present invention has also enabled a Water Cannon delay adjustment based on the RH Spray flow levels. In this case, a simple delay period (time window for water canon activation) is calculated on a linear basis from the time Min_Time to Max_Time based on the corresponding RH_Spray level. The Water Cannon screen is shown in FIG. 7. This leaves the 'intelligent logic' in the water canon untouched except for the delay between the blower activation. The knowledge based sootblwoing system can interact with any number of other systems to implement increasing complex strategies.

Effectiveness Tables

Figure 8:
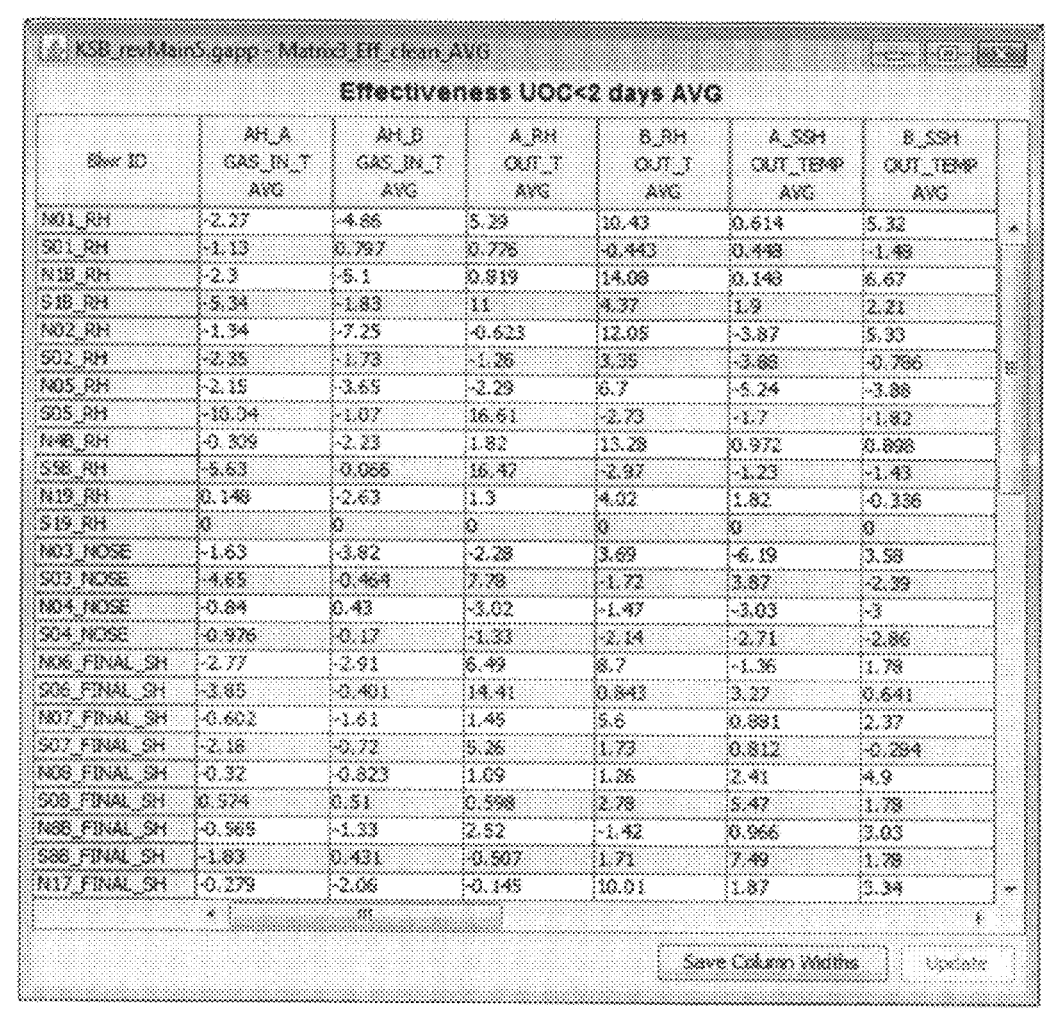

The system of the present invention keeps tables of the effectiveness of every blower versus every analog collected by the KSB data link. These must meet the steady state conditions defined in the System Tuning and they are averaged over the last 20 valid sootblowing operations or any other predetermined number. The table is show below in FIG. 8.

Effectiveness tables are built for 'clean unit' and 'dirty unit' as defined by the parameter UOC clean period (days). Blows that occur during the clean period and are steady state are put into the clean table and blows after the UOC clean period are put into the dirty unit table. There will be many compounding factors, such as fuel type, other blowers running, unit demand MW changing, mills in service, etc. These tables do not try to capture this, but are averaged over a long period to show correlations to help tune the individual blower limits. They are to used for guidance in tuning. It is not recommended any automatic feedback loops be implemented using this data. For example, if N01_RH continues to show a 30 Deg. F. correlation with the economizer Gas In T, then care should be take to not N01_RH blow if the Gas In T is near a limit. Instead, the Limit for this individual blower should be to level so that when N01_RH is activated it does cause an alarm.

The overhead of calculating and keeping all data is small and well worth the trade-off of seeing unexpected correlations develop. If operations identify a parameter that may be affected by sootblowing and control problems exist the logic can be easily changed to add the point and see what correlations exist in the data. Effectiveness table can be used in many different capacities, from advisor capacity (i.e. data collection) to automatic tuning of slopes and curves in for time window adjustments. They may also feed statistical and n-net and first principal models that in turn may provide feedback to this or other systems.

SUMMARY

In summary, the present invention typically includes:

1) A simple rule based system based on the concept time constraints. The time constraints are tied to high quality DCS setpoints. No assumptions regarding sootblowers affect on heat flux, cleanliness need be made. The user starts with approximate limits which may tuned over time based on actual operating experience. The result is a system with no sequences or sootblowing queues, but instead a real-time evaluation of the complete system.

2) Through use of a Graphical Programming Environment (GPE) the system fully exposes all parameters to the end-user. This is done primarily through a set of tuning screens, but also through special logic the user may have included for their specific power plant or process. One deficiency with prior art model based systems, is the equations and tuning parameters are hard to access, or are presented as 'black boxes' preventing tuning of the control system by the end-user.

3) The system includes auto-retry and an internal fail monitor. With the GPE it is easy to create additional monitoring of the sootblowing system. One example is the creation of a monitor that looks at how long a sootblower has run after activation. If the period is too short, the blower may be restarted as the short duration is symptomatic of an aborted sootblow. For sootblowers not activated very often, water build-up can cause the steam pressure to not meet a permissive value in the PLC thereby causing an early retraction of the blower. In a normal sequence system, this blower can then be skipped until the next time it occurs in a sequence. The present invention permits retries because the problem can clear itself. If after N passes, it is unable to complete, the system will generate an alarm and potentially a message (to an operator console, and/or e-mail and/or other reporting mechanism) that highlights that the blower is not functioning properly. The blower can be put into an alarm condition prohibiting any sootblowing until the alarm is cleared through maintenance and/or the expiration of a timer. In the case of a timer, when the timer has expired, the present invention will try again as if the alarm had not occurred, and if it fails again, the cycle will repeat (the blower can also be flagged as suspicious or otherwise).

4) The ability to treat each source of sootblowing medium (air, water, steam) as a separate system for purposes of creating independent fuzzy constrained systems. This leads to a significant advantage with regards to the up-time of the system during maintenance. Also, provides a benefit in maintaining side to side setpoint values.

In final summary, the present invention relates to a rule-based system for controlling sootblowing at power plants that uses a time-constrained window and includes a control computer coupled to a sootblowing control system that controls a plurality of sootblowing systems, where a plurality of sootblowing rules stored in the control computer. The control computer operates the sootblowing control system in real time according to these rules by incorporating the parameters. The control computer generally evaluates each blower during each program cycle to cause a chosen blower to activate. The control computer evaluates each blower against DCS control system values and/or models to determine which blower is chosen.

The system is configured where rules may be added, modified or deleted while the system is running with changes taking affect on a next program cycle or a program cycle designated by a user. Typically, different types of sootblowing sources such as air water or steam are treated as different systems. The system generally has a system retry and an internal fail monitor. The system can activate sootblowers from different headers simultaneously.

In many cases, the rule-based graphical system has a graphical control system running on a computer presenting a plurality of tuning screens exposing sootblowing parameters with a plurality of sootblowing rules stored in the graphical control system. The graphical control system normally operates a sootblowing control system in real time according to the rules by incorporating the parameters in decisions.

Several descriptions and illustrations have been provided to aid in understanding the present invention. One with skill in the art will realize that numerous changes and variations are possible without departing from the spirit of the invention. Each of these changes and variations is within the scope of the present invention.

I claim:

1. A rule-based system for controlling sootblowing at power plants comprising:
   a control computer coupled to a sootblowing control system that controls a plurality of sootblowers;
   a plurality of physical parameter inputs to the control computer including temperature, pressure and flow values related to various sootblowers;
   a set of computer instructions stored in memory in the control computer executable by the control computer to evaluate a fuzzy function of the physical parameter inputs, the fuzzy function being configured to evaluate tradeoffs in time overdue for activating a particular sootblower and importance of the particular sootblower to determine a ranking of all sootblowers controlled by the control computer and a time window for each sootblower to activate, said fuzzy function also adapted to take into consideration effects on the physical parameters relating to other sootblowers when the particular sootblower is activated.

2. The rule-based system of claim 1 where rules may be added, modified or deleted while the system is running with changes taking affect on a next program cycle or a program cycle designated by a user.

3. The rule-based system of claim 1 where different types of sootblowing sources are treated as different systems.

4. The rule-based system of claim 2 wherein said different types of sootblowing systems are chosen from the group consisting of air, water and steam.

5. The rule-based system of claim 1 further comprising a system retry.

6. The rule-based system of claim 1 further comprising an internal fail monitor.

7. The rule-based system of claim 1 wherein whenever said rule-based system runs, it evaluates every sootblower in said power plant.

* * * * *